(12) United States Patent
Kim et al.

(10) Patent No.: US 11,824,246 B2
(45) Date of Patent: Nov. 21, 2023

(54) CAVITY FILTER WITH A SLIM AND COMPACT STRUCTURE

(71) Applicant: KMW INC., Hwaseong-si (KR)

(72) Inventors: Duk Yong Kim, Yongin-si (KR); Sung Ho Jang, Yongin-si (KR); Joung Hoe Kim, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 761 days.

(21) Appl. No.: 16/945,750

(22) Filed: Jul. 31, 2020

(65) Prior Publication Data
US 2020/0365960 A1    Nov. 19, 2020

Related U.S. Application Data

(63) Continuation of application No. PCT/KR2019/001268, filed on Jan. 30, 2019.

(30) Foreign Application Priority Data

Jan. 31, 2018  (KR) .......................... 10-2018-0012497
Jan. 30, 2019  (KR) .......................... 10-2019-0011668

(51) Int. Cl.
*H01P 1/208*    (2006.01)
*H01P 7/06*     (2006.01)
(Continued)

(52) U.S. Cl.
CPC .......... *H01P 1/2086* (2013.01); *H01P 1/2088* (2013.01); *H01P 7/065* (2013.01);
(Continued)

(58) Field of Classification Search
CPC ...... H01P 1/2086; H01P 1/2088; H01P 7/065; H01P 1/2053; H01P 1/207;
(Continued)

(56) References Cited

U.S. PATENT DOCUMENTS 9,716,301 B2 *    7/2017  Park ..................... H01P 7/04
2003/0089514 A1 * 5/2003  Hayama ............... H05K 1/141
                                                        174/352
(Continued)

FOREIGN PATENT DOCUMENTS

CN    203119103 U    8/2013
CN    206432522 U    8/2017
(Continued)

OTHER PUBLICATIONS

Extended European Search Report dated Oct. 5, 2021 for European Application No. 19746889.5.
International Search Report for PCT/KR2019/001268 dated May 7, 2019 and its English translation.

*Primary Examiner* — Travis S Chambers
(74) *Attorney, Agent, or Firm* — INSIGHT LAW GROUP, PLLC; Seung Lee

(57) ABSTRACT

A cavity filter comprising: a resonance element including a coupling block; a first case and a second case housing the resonance element; a terminal unit penetrating the first case to be connected to an electrode pad of a PCB provided on the outside of the first case and the other end thereof is electrically connected to the coupling block of the resonance element; and an assembly unit provided on either one side or both sides of the case, and having a terminal insertion hole in which the terminal unit is insertedly provided, wherein the assembly unit is formed to protrude to the outside from a lower surface of the first case. the assembly unit provide a height between the first casing and PCB so the cavity filter avoid interference with the devices mounted on the PCB.

13 Claims, 9 Drawing Sheets

(51) Int. Cl.
*H01R 13/24* (2006.01)
*H01R 12/71* (2011.01)
*H01R 13/719* (2011.01)
*H01R 13/66* (2006.01)
*H04B 7/0413* (2017.01)

(52) U.S. Cl.
CPC ....... *H01R 12/714* (2013.01); *H01R 13/2407* (2013.01); *H01R 13/2421* (2013.01); *H01R 13/66* (2013.01); *H01R 13/719* (2013.01); *H04B 7/0413* (2013.01)

(58) Field of Classification Search
CPC . H01P 1/20309; H04B 7/0413; H01R 12/714; H01R 13/2407; H01R 13/2421; H01R 13/719; H01R 13/66
See application file for complete search history.

(56) References Cited

U.S. PATENT DOCUMENTS

2013/0330944 A1   12/2013  Rucki et al.
2023/0045912 A1*  2/2023  Park ..................... H01P 7/04

FOREIGN PATENT DOCUMENTS

| | | |
|---|---|---|
| CN | 108448213 A | 8/2018 |
| JP | 2764903 B | 4/1998 |
| JP | 2010-097772 A | 4/2010 |
| JP | 2017-535183 A | 11/2017 |
| KR | 10-2011-0041919 A | 4/2011 |
| KR | 10-1408249 B1 | 6/2014 |
| KR | 10-2017-0021750 A | 2/2017 |
| KR | 10-1728152 B1 | 4/2017 |
| KR | 10-1801260 B1 | 11/2017 |

* cited by examiner (a)

(b)

(c)

(d)

(e)

CAVITY FILTER WITH A SLIM AND COMPACT STRUCTURE

CROSS-REFERENCE TO RELATED APPLICATIONS

This application is a Continuation of International Application No. PCT/KR2019/001268, filed on Jan. 30, 2019, which claims the benefit of and priority to Korean Patent Application Nos. 10-2018-0012497, filed on Jan. 31, 2018, and 10-2019-0011668, filed on Jan. 30, 2019, the content of which are herein incorporated by reference in their entirety.

TECHNICAL FIELD

The present disclosure relates to a cavity filter, and more particularly, to a cavity filter for Massive MIMO antennas, which is fastened to a printed circuit board through an improved connector structure in consideration of the assembly and size of the cavity filter.

BACKGROUND ART

This section merely provides background information related to the present disclosure that is not necessarily prior art.

Multiple-input multiple-output (MIMO) is a technology that dramatically increases data transmission capacity by means of multiple antennas and that employs a spatial multiplexing scheme in which transmitters transmit different types of data through individual transmit antennas and receivers separate the transmitted data through appropriate signal processing. Accordingly, as the number of transmit/receive antennas is increased simultaneously, it is possible to transmit more data through an increase in channel capacity. For example, if 10 antennas are used, about 10 times a channel capacity is secured in the same frequency band, compared to a current single antenna system.

A 4G LTE-advanced network uses up to 8 antennas, and products equipped with 64 or 128 antennas are currently being developed for a pre-5G network. Base station equipment with a much larger number of antennas is expected to be used in a 5G network, which is called Massive MIMO. Although cell operation is currently implemented in a 2-dimensional manner, 3D-beamforming is able to be applied thereto by introduction of Massive MIMO. Accordingly, the Massive MIMO is also referred to as full dimension MIMO (FD-MIMO).

In the Massive MIMO, as the number of antennas increases, the number of transceivers and filters increases together. As of 2014, more than 200,000 base stations are installed nationwide in Korea. Accordingly, a cavity filter structure is required to minimize a mounting space and facilitate mounting, and an RF signal line connection structure is required to allow cavity filters, which are individually tuned, to provide the same filter characteristics even after being mounted to antennas. An RF filter having a cavity includes a resonator, which is composed of a resonant rod as a conductor, and the like, inside a box structure made of a metallic conductor, so that only an electromagnetic field having a natural frequency exists so as to allow only a characteristic frequency of ultra-high frequencies to pass through the filter by resonance. Such a band pass filter having a cavity is widely utilized as a filter for base station antennas for mobile communication since it has a small loss of insertion and is advantageous for high power.

DISCLOSURE

Technical Problem

Various embodiments are directed to a cavity filter having a slimmer and compact structure and equipped with an RF connector in a thickness direction in a body thereof.

Various embodiments are also directed to an assembly method capable of minimizing a cumulative amount of assembly tolerances caused when assembling a plurality of filters and to an RF signal connection structure that is easily mounted and keeps filter's frequency characteristics uniform.

Technical Solution

According to an aspect of an exemplary embodiment, there is provided a cavity filter that includes a resonant element including a coupling block, a first casing including the resonant element therein, a second casing disposed to cover one surface of the first casing, a terminal unit passing through the first casing such that one end thereof protrudes to be connected to an electrode pad of an external member provided outside the first casing and the other end thereof is electrically connected to the coupling block of the resonant element provided in proximity to the second casing, the terminal unit being electrically insulated from the first casing, and an assembly unit provided on either one side or both sides of the first casing in a longitudinal direction thereof and formed with a terminal insertion hole into which the terminal unit is inserted and installed, wherein the assembly unit protrudes outward from a lower surface of the first casing.

The terminal insertion hole may be formed in such a manner that at least a portion of the first casing is recessed from the lower surface of the first casing or extends from the first casing toward a PCB. The terminal unit may include a pin member disposed in the terminal insertion hole and configured such that one end thereof is connected to the coupling block of the resonant element and the other end thereof is connected to the PCB, and a terminal body through which the pin member passes, and which is installed together with the pin member in the terminal insertion hole, the terminal body having an elastic member accommodated therein to apply an elastic force to the pin member.

The terminal body may be provided therein with a pin connector elastically supported toward the PCB by the elastic member.

The pin connector may have a tip further protruding outward from the terminal insertion hole by the elastic member.

The terminal insertion hole may include a first insertion hole having a relatively larger inner diameter on its side where the PCB is provided, and a second insertion hole having a relatively smaller inner diameter than the first insertion hole. The cavity filter may further include a dielectric bush inserted into the second insertion hole.

The cavity filter may further include a terminal head block coupled to the terminal body and seated in the first insertion hole.

The cavity filter may further include a ground terminal electrically connected to the first casing. The first casing may be formed with an annular groove surrounding the first insertion hole to have an installation surface on which the ground terminal is installed.

The annular groove may be in the form of an annular dovetail in which a circumferential surface diameter corresponding to its inner diameter increases in a depth direction. The annular groove may have a minimum inlet inner diameter that allows the ground terminal to shrink by elasticity and be inserted into the annular groove, thereby preventing separation of the ground terminal.

The ground terminal may include a fixing ring seated on and fixed to the installation surface of the annular groove, and a plurality of elastic grounds circumferentially formed on an inner peripheral end of the fixing ring and extending toward the center thereof while obliquely extending toward the PCB.

The terminal insertion hole may include a first insertion hole having the relatively largest diameter on its side where the PCB is provided, a second insertion hole having a relatively smaller inner diameter than the first insertion hole, and a third insertion hole having a relatively smaller inner diameter than the second insertion hole. The cavity filter may further include a dielectric bush inserted into the second and third insertion holes, the dielectric bush being in the form of a two-stage cylinder.

The terminal unit may further include a pin member disposed in the terminal insertion hole and configured such that one end thereof is connected to the resonant element and the other end thereof is connected to the PCB. The pin member may include a pin corresponding to the one end of the terminal unit and positioned over the second and third insertion holes such that the pin is connected to the resonant element, a terminal body being in the form of a two-stage cylinder integral with the pin, the terminal body being formed therein with a socket having a cone-shaped opening, the terminal body being positioned over the first insertion hole, and an elastic connector corresponding to the other end of the terminal unit and inserted and fixed into the socket, the elastic connector being connected to the PCB.

The elastic connector may be a cylindrical structure that is inserted into the socket, and may include a truncated conical pin-socket contact portion inserted corresponding to the cone-shaped opening and an impedance matching portion extending from the pin-socket contact portion.

The elastic connector may be inserted into the socket while being in contact with the PCB, and may include a circular spring formed to have a circular vertical cross-section in its constant width except for both ends and two plate projections protruding perpendicular to a circumference of the circular spring from two points adjacent thereto.

Advantageous Effects

The present disclosure provides a cavity filter having a slim and compact structure and equipped with an RF connector in a thickness direction in a body thereof. Therefore, it is possible to reduce a size of an antenna system, to perform verification of each individual cavity filter with high reproducibility and with rapidity, and to easily mount a number of cavity filters into base station antennas for mobile communication.

Figure 1:
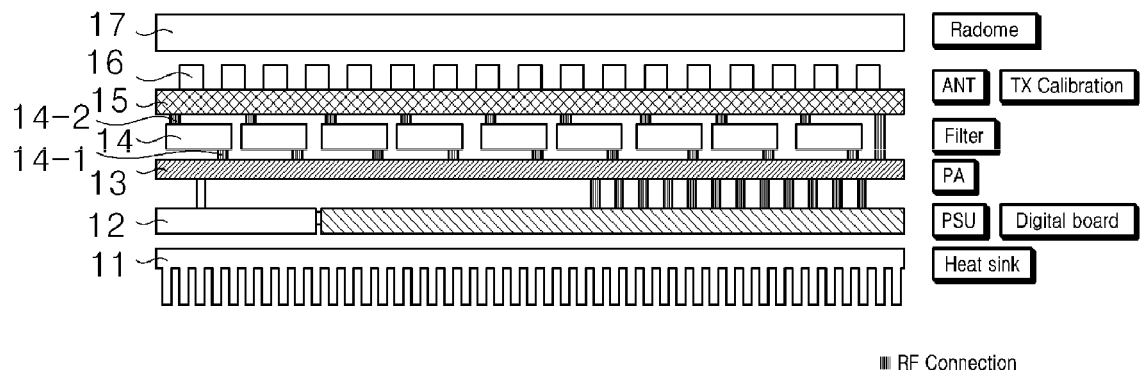
FIG. 1 is a view illustrating an exemplary stacked structure of Massive MIMO antennas.

LIST OF REFERENCE NUMERALS 1, 5: antenna device 11: heat sink
12: power supply unit (PSU) 13: PCB
14: cavity filter 15: antenna board
16: antenna 17: radome
18: cavity filter 20: terminal unit
80: first casing 81: second casing
84: assembly unit 86: lower surface
88: bottom surface of first casing 110: terminal insertion hole
112: first insertion hole 114: second insertion hole
131: terminal body 132: pin member
133: guide 150: elastic member
160: ground terminal 170: annular groove
210: terminal insertion hole 212: first insertion hole
214: second insertion hole 216: third insertion hole
220, 222: dielectric bush 230: pin member
232: pin 234: terminal body
235: protrusion 236: socket
237: first annular groove 238: opening
240: elastic connector 242: annular protrusion
244: pin-socket contact portion 246: impedance matching portion
248: cut portion 249: electrode edge
250: elastic member 260: ground terminal
270: annular groove 310: terminal insertion hole
312: first insertion hole 314: second insertion hole
316: third insertion hole 320: dielectric bush
322: first bush 324: second bush
326, 328: through-hole 330: pin member
332: pin 334: terminal body
335: protrusion 336: socket
338: opening 340: elastic connector
342: plate projection 344: circular spring
346: two points 360: ground terminal

BEST MODE

Reference will now be made in detail to exemplary embodiments of the present disclosure, examples of which are illustrated in the accompanying drawings. It should be noted that reference numerals are added to the components of the accompanying drawings to facilitate understanding of the embodiments described below and the same reference numbers will be used throughout the drawings to refer to the same or like parts wherever possible. In certain embodiments, detailed descriptions of constructions or functions well known in the art may be omitted to avoid obscuring appreciation of the disclosure by a person of ordinary skill in the art.

The terms such as "first", "second", "A", "B", "(a)", and "(b)" may be used herein to describe components in the embodiments of the present disclosure. These terms are not used to define an essence, order or sequence of a corresponding component but used merely to distinguish the corresponding component from other component(s). It will be understood that when an element is referred to as "comprising or including" any element, it does not exclude other elements, but can further comprise or include the other elements unless otherwise specified. In addition, the term "part", "module" or the like used herein refer to a unit for processing at least one function or operation, which may be implemented by hardware or software, or in combination thereof.

FIG. 1 is a view illustrating an exemplary stacked structure of Massive MIMO antennas.

Referring to FIG. 1, an antenna device 1 includes a housing (not shown) having a heat sink 11 formed therein, and a radome 17 coupled to the housing. The housing has a built-in antenna assembly. A power supply unit (PSU) 12 is coupled to the lower portion of the housing, for example, through a docking structure. The power supply unit 12 provides operating power to operate electronic components included in the antenna assembly.

The antenna assembly typically has a structure in which a plurality of antennas 16 are arranged on the front surface of an antenna board 15, the same number of cavity filters 14 as the number of antennas 16 is arranged on the back surface of the antenna board 15, and a related PCB 13 is subsequently stacked thereon. The cavity filters 14 are prepared to be tuned and verified in detail such that each individual cavity filter has a frequency characteristic according to the specifications of the antenna assembly before mounting. It is preferable that the cavity filters be rapidly tuned and verified in the same environment as the mounting.

Figure 2:
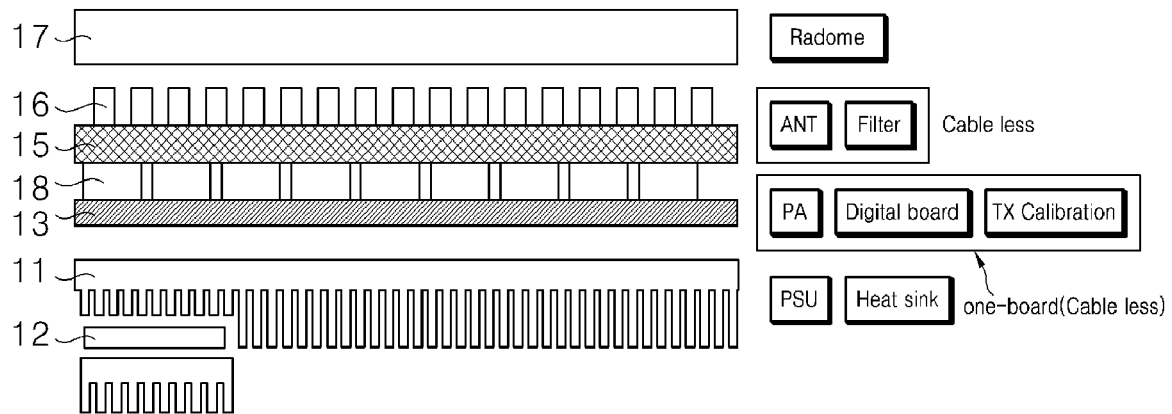
FIG. 2 is a cross-sectional view illustrating a state in which cavity filters are stacked between an antenna board and a control board according to an embodiment of the present disclosure.

FIG. 2 is a cross-sectional view illustrating a state in which cavity filters are stacked between an antenna board and a control board according to an embodiment of the present disclosure.

Referring to FIG. 2, there may be provided an antenna device 5, in which typical RF connectors 14-1 and 14-2 are excluded from the exemplary stacked structure of Massive MIMO antennas illustrated in FIG. 1. Thus, the antenna device 5 provides easy connectivity and has a lower height profile. In addition, the antenna device 5 includes terminal units 20, as RF connections, in a height direction on both sides thereof according to various embodiments to be described later. Thus, it is advantageous to keep the RF connections constant even though vibration and thermal deformation occur in an antenna board 15 or a PCB 13, resulting in no change in frequency characteristics.

Figure 3:
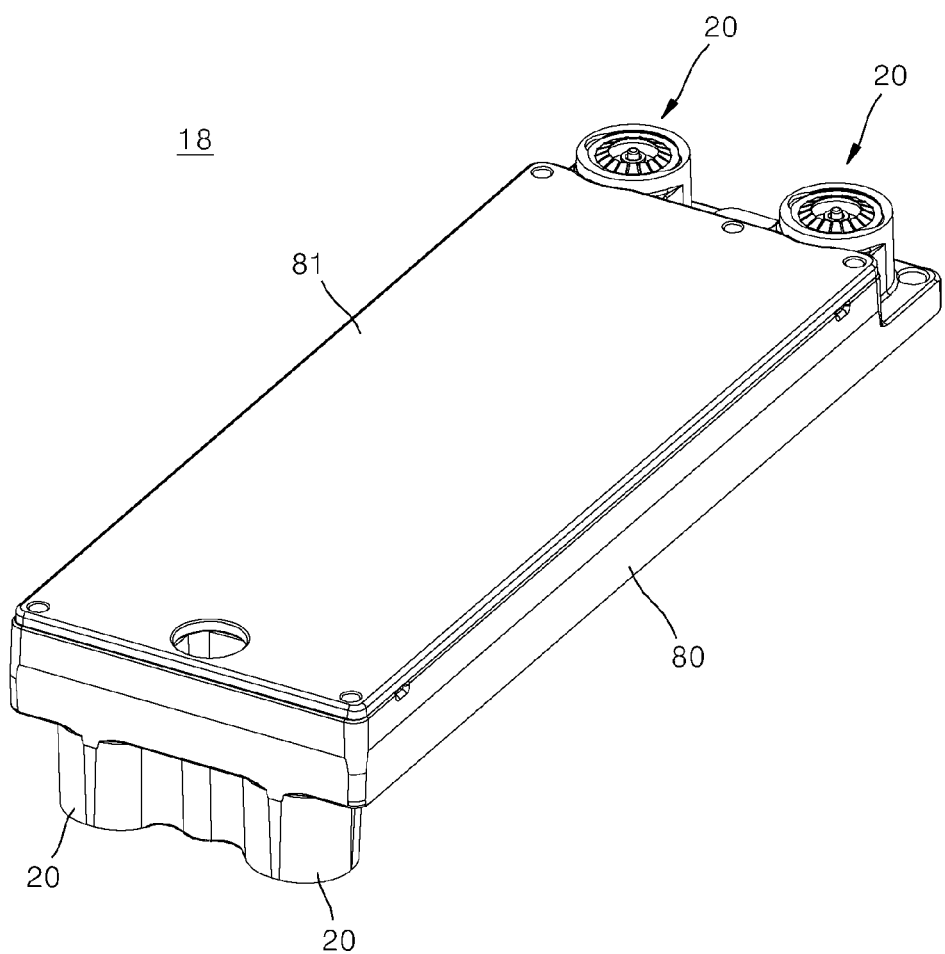
FIG. 3 is a perspective view illustrating a structure of one cavity filter according to the embodiment of the present disclosure.
Figure 4:
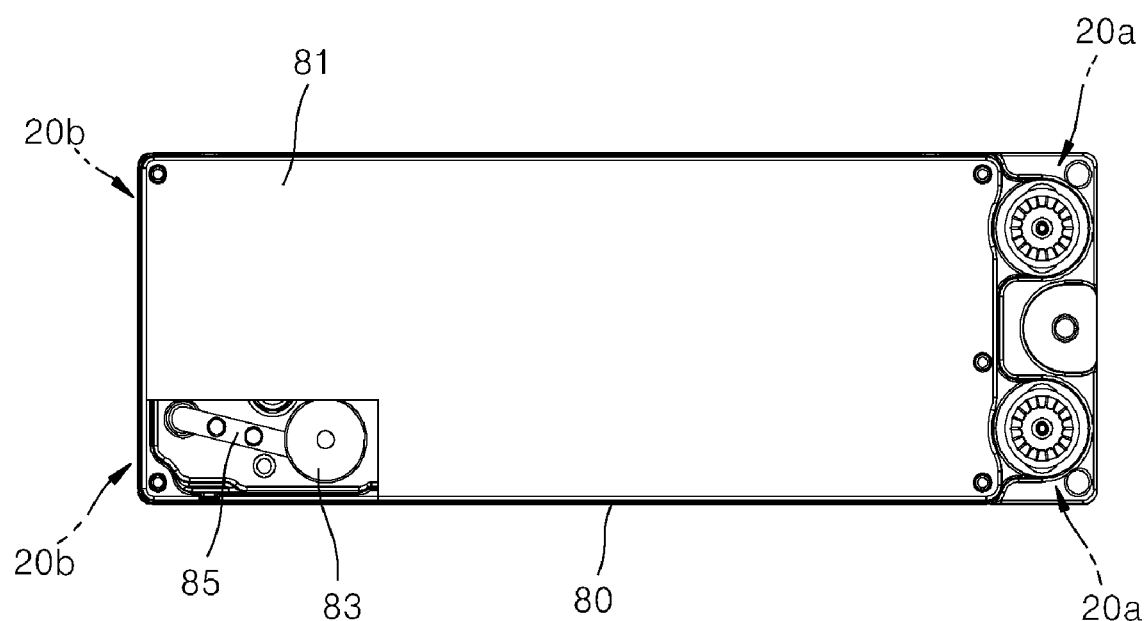
FIG. 4 is a top view illustrating a structure in which terminal units are provided in a cavity filter according to a first embodiment of the present disclosure.
Figure 5:
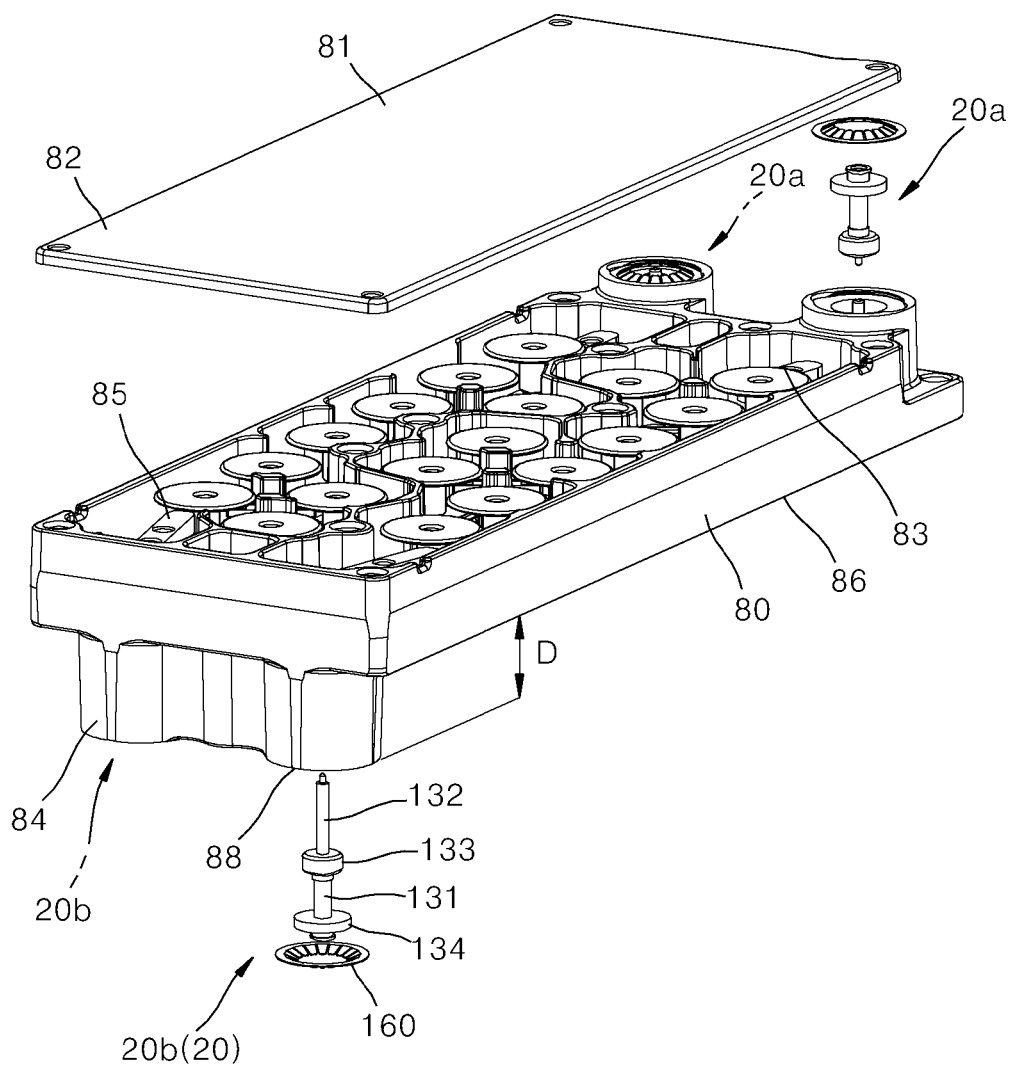
FIG. 5 is an exploded perspective view illustrating the structure in which the terminal units are provided in the cavity filter according to the first embodiment of the present disclosure.
Figure 6:
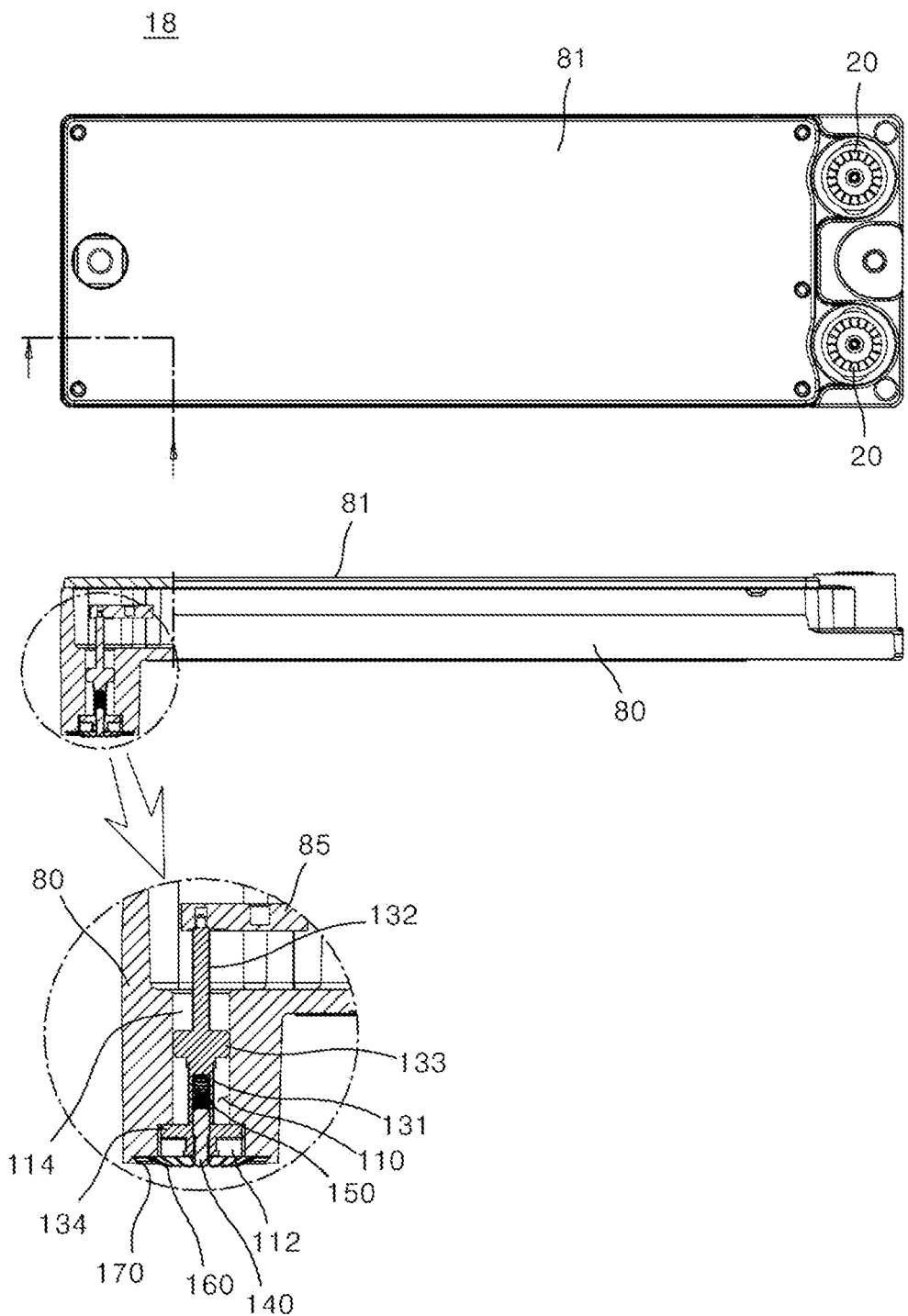
FIG. 6 is a cross-sectional view illustrating the cavity filter according to the first embodiment of the present disclosure, including an enlarged view of one pin-member-type terminal unit provided in the cavity filter.
Figure 7:
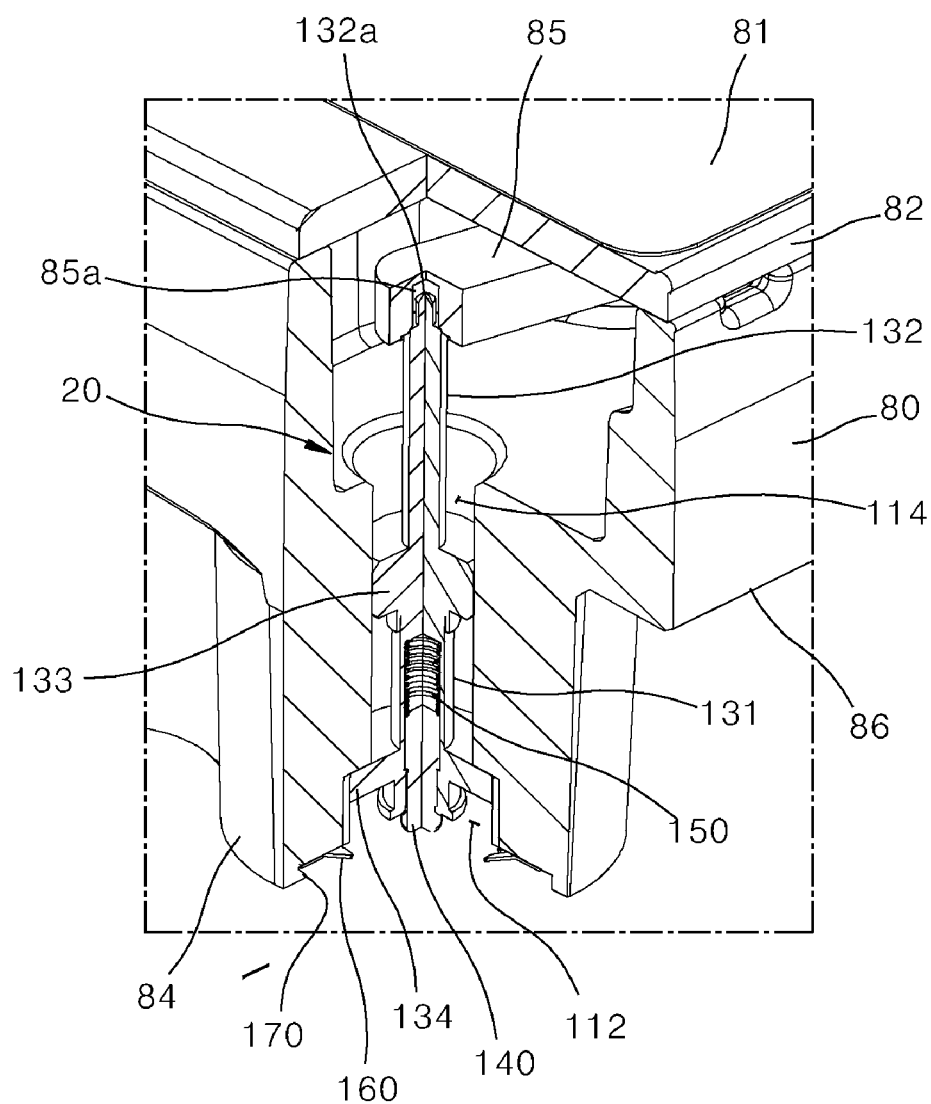
FIG. 7 is a partial cutaway perspective view illustrating a state in which the pin-member-type terminal unit is installed to an associated assembly unit according to the first embodiment of the present disclosure.

FIG. 3 is a perspective view illustrating a structure of one cavity filter according to the embodiment of the present disclosure. FIG. 4 is a top view illustrating a structure in which terminal units are provided in a cavity filter according to a first embodiment of the present disclosure. FIG. 5 is an exploded perspective view illustrating the structure in which the terminal units are provided in the cavity filter according to the first embodiment of the present disclosure. FIG. 6 is a cross-sectional view illustrating the cavity filter according to the first embodiment of the present disclosure, including an enlarged view of one pin-member-type terminal unit provided in the cavity filter. FIG. 7 is a partial cutaway perspective view illustrating a state in which the pin-member-type terminal unit is installed to an associated assembly unit according to the first embodiment of the present disclosure.

Referring to FIGS. 3 to 5, the cavity filter, which is designated by reference numeral 18, according to the embodiment of the present disclosure includes a first casing 80 that defines a hollow, which is an empty space therein, and has a plurality of resonant elements 83 arranged in the hollow, a second casing 81/82 provided as a cover to cover the first casing 80, and terminal units 20 provided in the height direction thereof on both longitudinal sides of the first casing 80. The terminal units 20 pass through the upper or lower surface of the first casing 80 and are electrically connected to coupling blocks 85 provided to connect the resonant elements 83 and an external member, for example, an electrode pad (not shown) of a PCB 13 or antenna board 15.

In more detail, the first casing 80 may be open at one side (the top in the drawing) thereof, and the second casing 81/82 may cover the open side of the first casing 80.

As illustrated in FIG. 5, the second casing 81/82 may include a cover panel 81 provided to cover one side of the first casing 80, and a support panel 82 provided inside the cover panel 81 and having support holes 82a formed to support flat portions of the resonant elements 83 to be described later.

The second casing 81/82 may be coupled to the first casing 80 by laser welding, soldering, or the like, or may be screwed to the first casing 80 by a fixing screw (not shown).

The first casing 80 and the second casing 81/82 may be made of a material such as aluminum (alloy), and may be plated, on at least a surface thereof defining the hollow, with silver or copper to improve electrical properties. In addition, the resonant elements 83 installed in the hollow defined by the first casing 80 and the second casing 81/82 may be made of a material such as aluminum (alloy) or iron (alloy), and may be plated with silver or copper.

The hollow defined in the first casing 80 may be provided with cavities in which the respective resonant elements 83 are accommodated. The hollow in the first casing 80 may be formed with a coupling window, which is in the form of a connection passage for interconnecting the individual cavities, to connect the resonant elements 83 in a multistage manner. The coupling window may be formed in such a way to cut a portion of a partition wall between the cavities to a predetermined size.

The first casing 80 may have assembly units 84 formed on one side and the other side in the longitudinal direction thereof so that the terminal units 20 provided as input terminals 20a and output terminals 20b are installed to the assembly units 84. Each of the assembly units 84 may be provided in the form of a through-hole passing through the open side of the first casing 80 in one direction or in an opposite direction.

Each of the assembly units 84 to which the terminal units 20 are installed may be formed to be thicker than a lower surface 86, which is a region between the first casing 80 and the associated assembly units 84, or than a region between the second casing 81/82 and the associated assembly units 84, according to the application thereof. For example, when the lower surface 86 corresponding to the other side of the first casing 80 is assembled to the PCB 13 on which various devices are mounted, the assembly units 84 on both sides or one side of the first casing 80 may provide a height (see reference numeral "D" of FIG. 5) to avoid interference with the mounted devices. In a cavity filter according to a first embodiment of the present disclosure, assembly units 84 to which terminal units 20 are installed are configured such that the assembly units 84 are provided on one longitudinal side of a first casing 80 and become thicker toward a related PCB 13.

As illustrated in FIG. 5, one(s) of the terminal units 20 may have an external terminal(s) exposed toward the bottom surface 88 of the first casing 80, and the other(s) thereof may have an external terminal(s) protruding from the assembly reference surface of the second casing 81. Depending on the type to which the cavity filter 18 is mounted, the external terminals of the terminal units 20 may also be exposed, for example, in the same direction with respect to the lower surface 86 of the first casing 80.

First Embodiment

The first embodiment of the present disclosure is directed to a cavity filter 18 used for base station antennas for mobile communication and installed on an external member. The cavity filter 18 includes a first casing 80 disposed on the external member and provided therein with resonant elements 83 and coupling blocks 85 connected thereto, and terminal units 20 configured to pass through the first casing 80 and to electrically connect an electrode pad of the external member to the coupling blocks 85 of the resonant elements 83, wherein the terminal units are electrically insulated from the first casing 80. Hereinafter, the terminal units 20 will be described as a common concept without being divided into input terminals 20a and output terminals 20b.

Here, each of the terminal units 20 may be installed into a terminal insertion hole 110 formed in such a manner that at least a portion of the first casing 80 is recessed inward from a lower surface 86 of the first casing 80 or extends from the first casing 80 toward a related PCB 13. In addition, the terminal unit 20 may include a pin member 132 disposed in the associated terminal insertion hole 110 and configured such that one end thereof is connected to the coupling block 85 extending from an associated one of the resonant elements 83 and the other end thereof is connected to the PCB 13, and a terminal body 131 through which the pin member 132 passes, and which is installed together with the pin member 132 in the terminal insertion hole 110 and has an elastic member 150 accommodated therein to apply an elastic force to the pin member 132.

As illustrated in FIG. 6, the terminal insertion hole 110 may include a first insertion hole 112 having a relatively larger inner diameter on the side thereof where the PCB 13 or the external member is provided, and a second insertion hole 114 having a relatively smaller inner diameter than the first insertion hole 112.

A guide 133 having a larger outer diameter than the terminal body 131 and the pin member 132 may be formed between the terminal body 131 and the pin member 132.

The guide 133 serves to stably fix the terminal body 131 and the pin member 132 in the second insertion hole 114 of the terminal insertion hole 110. That is, although not illustrated in the drawings, the second insertion hole 114 of the terminal insertion hole 110 may have a female thread formed on the inner peripheral surface thereof, and the guide 133 may have a male thread formed on the outer peripheral surface thereof, thereby enabling the terminal unit 20 to be installed into and screwed to the terminal insertion hole 110. Therefore, it is possible to improve the assembly of the terminal unit 20 to the terminal insertion hole 110 and accomplish the stable installation thereof.

In order to screw and assemble the terminal unit 20 to the terminal insertion hole 110 with an assembly tool such as a spanner inserted into a space exposed through the first insertion hole 112 of the terminal insertion hole 110, the PCB-side end of the terminal body 131 may have a hexagonal cross-section.

As illustrated in FIGS. 5 to 7, the terminal body 131 may be provided therein with a pin connector 140 which is elastically supported by the elastic member 150 such that the pin connector 140 is in constant contact with the electrode pad formed on the PCB 13 or the external member.

The pin connector 140 may have a tip that, by the elastic support of the elastic member 150, always passes through an associated assembly unit 84 to protrude toward the electrode pad of the PCB 13 or external member by a predetermined length. Accordingly, since the pin connector 140 is elastically supported and movable by the elastic member 150 when the cavity filter 18 according to the first embodiment of the present disclosure is installed between the PCB 13 and an antenna board 15, it is possible to get rid of an allowance tolerance designed for assembly.

In more detail, the elastic member 150 may be disposed in the terminal body 131 of the terminal unit 20, to elastically support the pin connector 140 toward the PCB 13 or the external member. Here, the elastic member 150 may be a spring, one end of which is supported in the internal space of the terminal body 131 while the other end thereof is supported by the inner end of the pin connector 140. The pin connector 140 may be latched on and supported by the inner surface of the terminal body 131 so as not to be ejected to the outside by the elastic support force of the elastic member 150.

The cavity filter 18 according to the first embodiment of the present disclosure may further include a dielectric bush (not shown) inserted into the first insertion hole 112. The space defined by the second insertion hole 114 may be filled with a dielectric.

The cavity filter 18 according to the first embodiment of the present disclosure may further include a terminal head block 134 that is coupled to the terminal body 131 and seated in the first insertion hole 112. The terminal head block 134 serves to stably fix the terminal body 131 and the pin member 132, which are slim as a whole, within the terminal insertion hole 110.

The terminal head block 134 may have a male thread formed on the outer peripheral surface thereof, as in the above-mentioned guide 133, and may be screwed to the first insertion hole 112 of the terminal insertion hole 110 through the engagement with the female thread on the inner peripheral surface of the first insertion hole 112.

The cavity filter 18 according to the first embodiment of the present disclosure may further include a ground terminal 160 that is electrically connected to the first casing 80.

The first casing 80 may be formed with an annular groove 170 surrounding the first insertion hole 112 to have an installation surface on which the ground terminal 160 is installed.

The annular groove 170 may be in the form of an annular dovetail in which a circumferential surface diameter corresponding to its inner diameter increases in a depth direction.

The annular groove 170 forming the installation surface on which the ground terminal 160 is installed will be described in detail later under the name of a "second annular groove".

As described above, since the cavity filter according to the first embodiment of the present disclosure is manufactured in a slim form as a whole, there is no need to increase the size of the terminal insertion hole 110. In addition, since the elastic force in the cavity filter is properly maintained by the elastic member 150, the impedance between the pin member 132 and the terminal insertion hole 110 can be kept constant.

Second Embodiment

Figure 8:
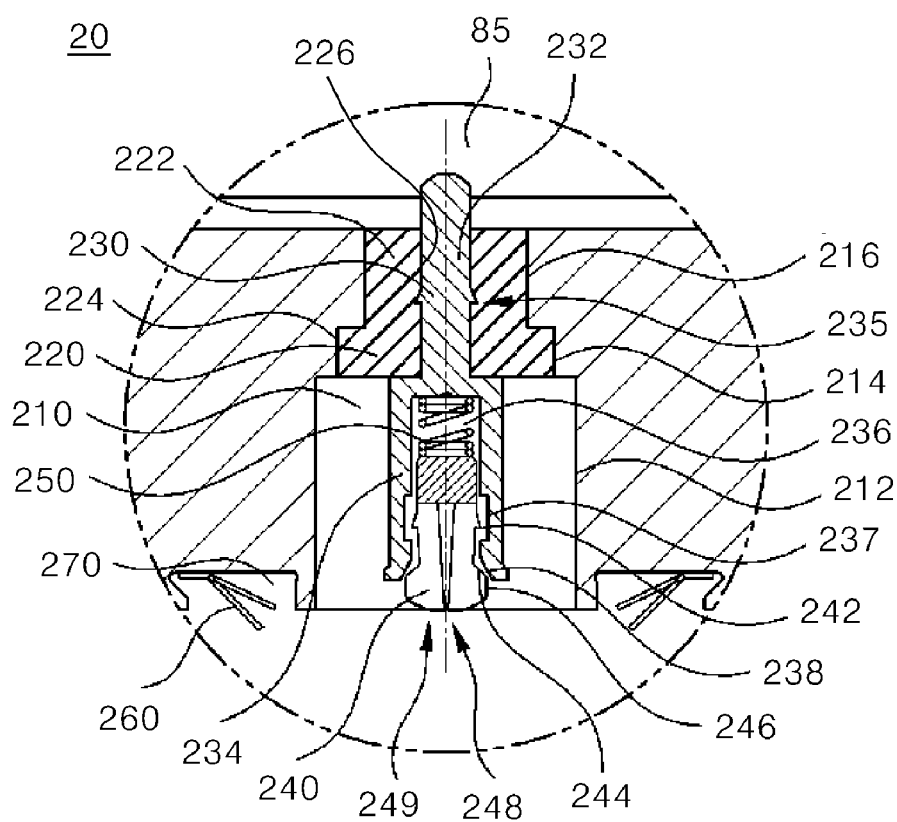
FIG. 8 is a cross-sectional view illustrating a structure of one terminal unit of a cavity filter according to a second embodiment of the present disclosure, wherein the terminal unit is provided with a push-pin-type elastic connector.
Figure 9:
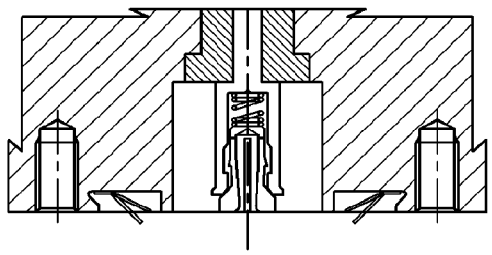
FIG. 9 is a side cross-sectional view illustrating the structure of the terminal unit of the cavity filter, provided with the push-pin-type elastic connector, according to the second embodiment of the present disclosure.
Figure 9:
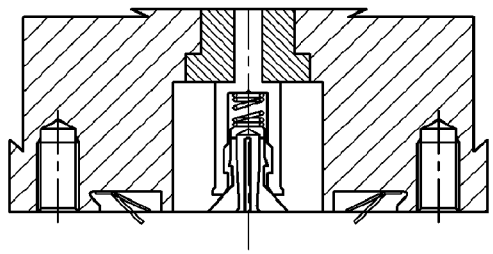
Figure 9:
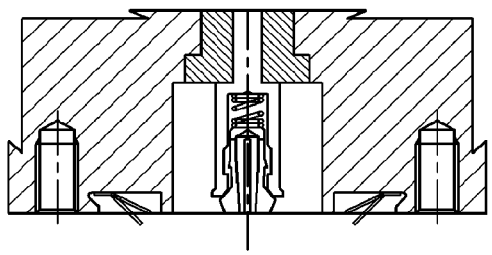
Figure 9:
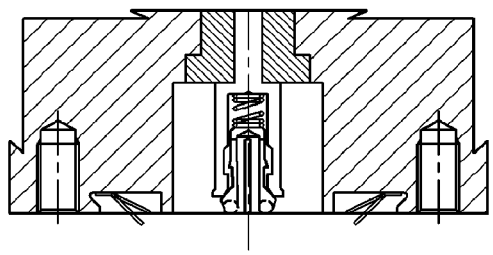
Figure 9:
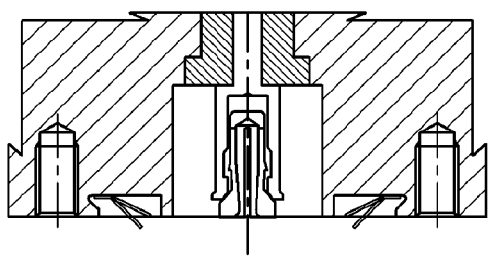

FIG. 8 is a cross-sectional view illustrating a structure of one terminal unit of a cavity filter according to a second embodiment of the present disclosure, wherein the terminal unit is provided with a push-pin-type elastic connector. FIG. 9 is a side cross-sectional view illustrating the structure of the terminal unit of the cavity filter, provided with the push-pin-type elastic connector, according to the second embodiment of the present disclosure.

The cavity filter, which is designated by reference numeral 18, according to the second embodiment of the present disclosure includes terminal units 20, which each include a terminal insertion hole 210, a dielectric bush 220, a pin member 230, an elastic connector 240, an elastic member 250, and a ground terminal 260.

The terminal insertion hole 210 has a cylindrical shape, and may be formed by passing through a first casing 80 from a lower surface 86 of the first casing 80 or by passing through the first casing 80 from an upper surface of the first casing 80. When the terminal insertion hole 210 is formed by passing through the first casing 80 from the upper surface of the first casing 80, a through-hole may be formed in a second casing 81/82. Accordingly, in view of this fact, the depth of the terminal insertion hole 210 may be adjusted. The terminal insertion hole 210 may be formed in a three-stage manner so that the diameter thereof is gradually reduced. The terminal insertion hole 210 is divided into a first insertion hole 212 having the largest diameter, a second insertion hole 214 having an intermediate diameter, and a third insertion hole 216 having the smallest diameter.

The dielectric bush 220/222 is in the form of a two-stage cylinder, and has a through-hole 226 passing through the center thereof. The dielectric bush 220 is sized to be inserted and fixed into the first and second insertion holes 212 and 214 of the terminal insertion hole 210. The dielectric bush 220/222 may be made of Teflon. Although the single body of the dielectric bush is described as being in the form of the two-stage cylinder in the present embodiment, the present disclosure is not limited thereto. The dielectric bush may also be in the form of a two-stage cylinder by assembling bodies having different diameters.

The pin member 230 is in the form of a two-stage cylinder in which a pin 232 and a terminal body 234 are formed longitudinally and integrally with each other. In the present embodiment, the terminal body 234 is formed with a hollow socket 236. The pin member 230 may be made of a beryllium copper (BeCu) material plated with gold. The pin 232 is inserted and fixed into the through-hole 226 of the dielectric bush 220/222. The pin 232 has a wedge-shaped protrusion 235 formed on the outer peripheral surface thereof to prevent the pin 232 from being ejected in a direction opposite to the direction of insertion of the pin 232. An annular stepped portion formed at the boundary between the pin 232 and the terminal body 234 is assembled to come into contact with one surface of the dielectric bush 220/222. In particular, when the dielectric bush 220/222 is in the form of a two-stage cylinder in which a first dielectric 200 occupies the second insertion hole 214 of the terminal insertion hole 210 and a second dielectric 222 occupies the third insertion hole 216 of the terminal insertion hole 210, the annular stepped portion of the terminal body 234 may be assembled in close contact with the first dielectric 220.

The terminal body 234 is formed to be shorter than the depth of the third insertion hole 216, is formed with the hollow socket 236 as described above, and is formed with a cone-shaped opening 238 with a diameter decreasing inward from the inlet thereof. In the present embodiment, the opening 238 may be inclined, for example, at an angle of 30 degrees relative to the central axis thereof. A first annular groove 237 may be formed in the cone-shaped opening 238 to prevent decoupling of the elastic connector 240 inserted into the first annular groove 237. The elastic member 250 may be inserted between the innermost surface of the opening 238 and the insertion tip of the elastic connector 240, in order to additionally provide a force that pushes the elastic connector 240 out of the opening 238.

The elastic connector 240 is a cylindrical structure that is inserted into the socket 236. The elastic connector 240 consists of a truncated conical pin-socket contact portion 244 inserted corresponding to the cone-shaped opening 238 and an impedance matching portion 246 extending from the pin-socket contact portion 244, wherein the pin-socket contact portion 244 and the pin-socket contact portion 244 are formed longitudinally and integrally with each other. The elastic connector 240 may be made of a BeCu material plated with gold. The cylindrical elastic connector 240 has a wedge section-shaped annular protrusion 242 formed in the longitudinal middle thereof, and the annular protrusion 242 protrudes from the outer peripheral surface of the cylindrical elastic connector 240. The annular protrusion 242 is accommodated in the first annular groove 237, when the elastic connector 240 is inserted into the socket 236, to prevent the elastic connector 240 from being decoupled from the socket 236.

The angle of the pin-socket contact portion 244 is larger than the angle of the cone-shaped opening 238 of the socket 236 by 5 to 10 degrees with respect to the central axis thereof. The elastic connector 240 has a cross-shaped cut portion 248 locally formed along the central axis thereof from the outer surface thereof exposed to the outside after the elastic connector 240 is inserted into the socket 236. The cut portion 248 has a depth to the end of the cylindrical elastic connector 240 beyond the truncated conical pin-socket contact portion 244. Although the cut portion 248 is described as having the cross shape in the present embodiment, the present disclosure is not limited thereto. The cut portion 248 may have a straight shape or may be in the form of a plurality of slots.

The elastic connector 240 has a length that allows the elastic connector 240 to protrude from the bottom surface 88 of the first casing 80 when the elastic connector 240 comes into contact with the cone-shaped opening 238 of the socket 236 in the state in which the cross-shaped cut portion 248 does not shrink by the insertion of the elastic connector 240 into the socket 236, and that allows the elastic connector 240 to be inserted while pressing the opening 238 of the socket 236 when the cavity filter 18 is mounted.

An outer edge on the outer surface of the elastic connector 240 is a region that is electrically connected to an electrode pad formed on a PCB 13 on which the cavity filter 18 is assembled while the elastic connector 240 shrinks. This outer edge is defined as an electrode edge 249. In an embodiment, the electrode edge 249 is rounded in a range of R 0.1 to R 0.5. Accordingly, the electrode edge 249 may have a uniform contact area with the electrode pad formed on the PCB 13, even though the elastic connector 240 shrinks and becomes a shallow cone shape in which the outer surface thereof is recessed from the plane. The cavity filter 18 may be actually assembled to the PCB 13 and may have a variety of height deviations. Since the electrode edge 249 has a round shape, the elastic connector 240 may have a uniform contact area even if there is a difference in the degree of shrinkage.

The angle of the opening 238, the angle of the pin-socket contact portion 244, the length of the elastic connector 240, and the round size of the electrode edge 249 are preferably selected based on when the PCB 13 is coupled to the one surface of the first casing 80 or the assembly reference surface of the second casing 81. In more detail, when the PCB 13 is coupled to the cavity filter 18, the elastic connector 240 is pushed up and slides along the opening 238 of the socket 236, so that the cross-shaped cut portion 248 shrinks. When the cut portion 248 shrinks, the angle of the pin-socket contact portion 244 of the elastic connector 240 decreases and the contact area between the opening 238 and the pin-socket contact portion 244 changes. The region where the electrode edge 249 is in contact with the electrode pad of the PCB 13 is also changed as the outer surface of the elastic connector 240 shrinks into a shallow cone shape. In addition, the force that the elastic member 250 inserted into the socket 236 pushes the elastic connector 240 toward the PCB 13 and the force including the reaction force from the pin-socket contact portion 244 act on respective contact portions, so that the contact surfaces thereof are elastically deformed.

Design specifications of the socket 236, the elastic connector 240, and the elastic member 250 for determining this contact area are preferably selected in consideration of the impedance of the terminal unit 20. That is, the design specifications are preferably determined to minimize the change in impedance along the signal path of the terminal unit 20 including the contact resistance determined by the contact area and the contact pressure. In particular, in the case of mobile communication antenna signals through which a high frequency is transferred, signal quality may be deteriorated if the characteristic impedance of the signal line is irregular. Impedance mismatching of the signal path in a multi-gigahertz signal may increase a voltage standing wave ratio (VSWR), resulting in deterioration in signal quality due to signal reflection and distortion.

Consideration for uniformly maintaining the impedance of the terminal unit 20 is also necessary in selecting the sizes of the first to third insertion holes 212 to 216 and the size of the terminal body 234. The third insertion hole 216 is spaced apart from the outer peripheral surface of the terminal body 234 with a predetermined air gap therebetween. For example, the dielectric bush 220/222 made of Teflon is interposed between the second and third insertion holes 214 and 216 and the pin 232. The pin 230 and terminal body 234 of the pin member 230 have a stepped diameter. In view of this fact, the diameter and depth of the second insertion hole 214 are preferably selected so that the impedance between the pin member 230 and the terminal insertion hole 210 is kept constant.

The dielectric constant of Teflon is about twice that of air. Accordingly, in view of this fact, the diameter of the first insertion hole 212 is formed to be larger than the diameters of the second and third insertion holes 214 and 216. For example, when the dielectric bush 220/222 is made of PEEK, which has a dielectric constant of about 3 times that of air, instead of Teflon, the diameter of the first insertion hole 212 is larger than in the dielectric bush made of Teflon.

FIGS. 9(a) to 9(e) illustrate various shapes of the electrode edge 249 and impedance matching portion 246 of the elastic connector 240 in contact with the electrode pad of the PCB 13 or external member. These shapes and sizes may be selected by performing numerical analysis in consideration of the distance between the elastic connector 240 and the first insertion hole 212 or by evaluating the VSWR of the terminal unit 20, for example, with a network analyzer.

FIG. 9(a) illustrates an example in which the impedance matching portion 246 protrudes vertically at a position away from the pin-socket contact portion 244 and the electrode edge 249 is finely rounded with a radius of R 0.1.

FIG. 9(b) illustrates an example in which the angle of inclination of the pin-socket contact portion 244 of the elastic connector 240 is maintained and the impedance matching portion 246 extends to the electrode edge 249.

FIG. 9(c) illustrates an example in which the impedance matching portion 246 has an inclined surface, the diameter of which decreases again, at a position away from the pin-socket contact portion 244.

FIG. 9(d) illustrates an example in which the impedance matching portion 246 has an inclined surface, the diameter of which decreases again, at a position away from the pin-socket contact portion 244 and the electrode edge 249 is relatively largely rounded with a radius of R 0.5.

FIG. 9(e) illustrates an example in which the elastic member 250 is omitted, and the force (contact pressure) pushing the elastic connector 240 and the electrode pad of the PCB 13 in contact therewith is formed by the reaction force from the pin-socket contact portion 244 as the cross-shaped cut portion 248 of the elastic connector 240 shrinks.

As described above, a second annular groove 270 may be formed outside the first insertion hole 212 to accommodate the ground terminal 260, which is inserted into the second annular groove 270 to surround the signal line, surround the cylindrical portion, and make firm ground connection.

Third Embodiment

Figure 10:
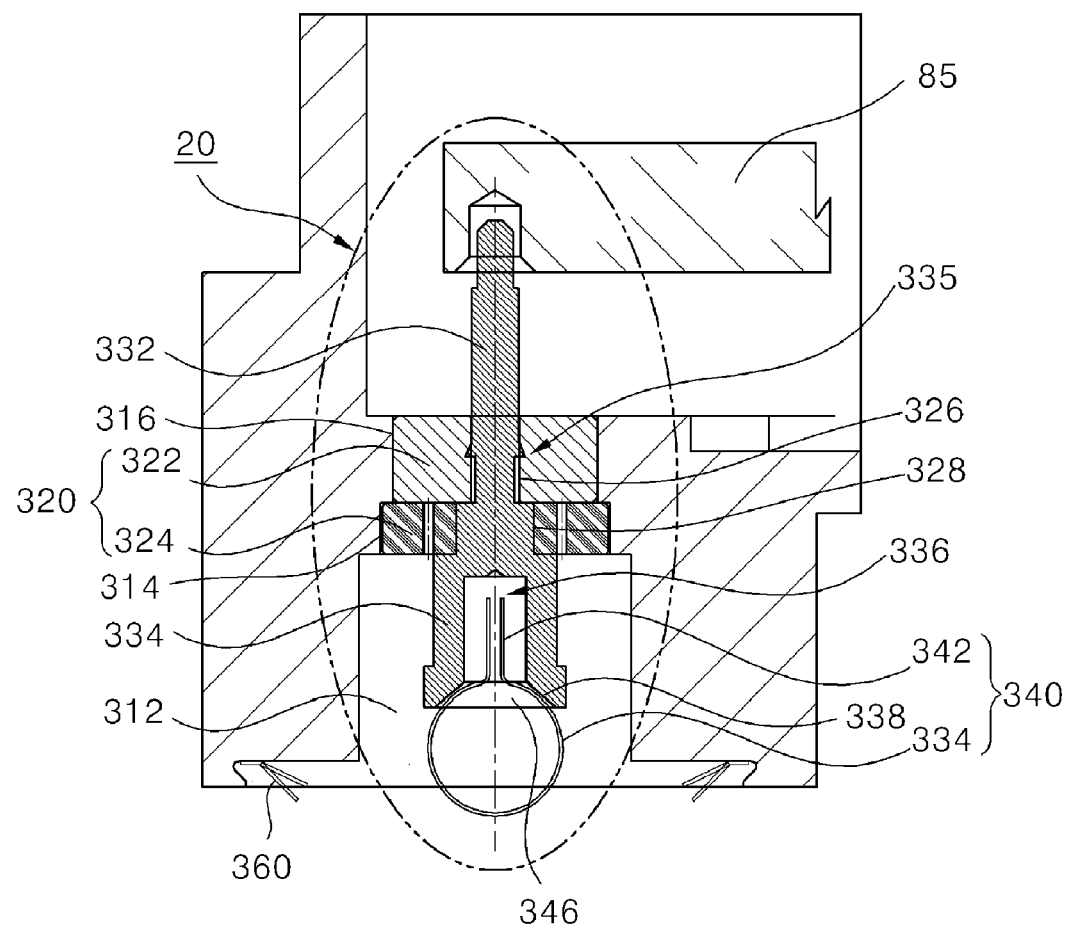
FIG. 10 is a cross-sectional view illustrating a structure of one terminal unit of a cavity filter according to a third embodiment of the present disclosure, wherein the terminal unit is provided with a push-ring-type elastic connector.

FIG. 10 is a cross-sectional view illustrating a structure of one terminal unit of a cavity filter according to a third embodiment of the present disclosure, wherein the terminal unit is provided with a push-ring-type elastic connector.

Referring to FIG. 10, the cavity filter according to the third embodiment of the present disclosure includes terminal units 30, which each include a terminal insertion hole 310, a dielectric bush 320, a pin member 330, a push-ring-type elastic connector 340, and a ground terminal 360.

The present embodiment of FIG. 10 is provided for more strictly impedance matching, and discloses an example in which the dielectric bush 320 is of a separate type that consists of two dielectric bushes 322 and 324 having through-holes 326 and 328 having different diameters of the through holes 326 and 328, and the pin member 330 has a two-stage pin 332 corresponding to the dielectric bush 320. However, the terminal insertion hole 310, the dielectric bush 320, the pin 332, and the ground terminal 360 may be configured identically to those in the above embodiment of FIG. 8. That is, the terminal insertion hole 310 may be divided into a first insertion hole 312 having the largest diameter, a second insertion hole 314 having an intermediate diameter, and a third insertion hole 316 having the smallest diameter, as in the pin-member-type second embodiment illustrated in FIGS. 8 and 9, and the dielectric bush 320 and the pin 332 may be installed identically to those in the second embodiment.

In more detail, the pin member 330 according to the present embodiment includes a pin 332 and a terminal body 334 having a socket 336 formed therein. The pin member 330 may be made of a BeCu material plated with gold. The pin 332 has a wedge-shaped protrusion 335 formed on the outer peripheral surface thereof to prevent the pin member 330 from being ejected in a direction opposite to the direction of insertion of the pin member 330. An annular stepped portion formed at the boundary between the pin 332 and the terminal body 334 is assembled to come into contact with one surface of the dielectric bush 320. In more detail, when the dielectric bush 320 for impedance matching is provided as two separate dielectric bushes (see reference numerals 322 and 324), such as a first dielectric 322 configured to occupy the third insertion hole 316 of the terminal insertion hole 310 and a second dielectric 324 configured to occupy the second insertion hole 314 of the terminal insertion hole 310, the annular stepped portion between the pin 332 and the terminal body 334 is in close contact with the second dielectric 324. The terminal body 334 is formed to be shorter than the depth of the first insertion hole 312, is hollow, and is formed with a cone-shaped opening 338 with a diameter decreasing inward from the inlet thereof. In the embodiment of the present disclosure, the cone-shaped opening 338 is inclined, for example, at an angle of 60 degrees relative to the central axis thereof, and circumscribe an outer peripheral surface of a circular spring 344 of the push-ring-type elastic connector 340.

The push-ring-type elastic connector 340 according to the present embodiment is formed from a spring plate with a constant width in most of its length except for both ends. The elastic connector 340 includes a circular spring 344 on one side thereof and two plate projections 342 protruding perpendicular to the circumference of the circular spring 344 from two points 346 adjacent thereto. The elastic connector 340 has a width that allows the plate projections 342 to be inserted into the socket 336. The elastic connector 340 may be made of a BeCu material and may be plated with gold. The two plate projections 342 are separated from each other, and the circular spring 344 operates as a leaf spring in such a manner that the shape of the circular spring 344 is deformed into an ellipse when an external force acts on the circular spring 344 in its central direction.

That is, when the two plate projections 342 of the elastic connector 340 are inserted into the socket 336, the plate projections 342 are separated from each other so that the longitudinal ends of the plate projections 342 are in close contact with the inner peripheral surface of the socket 336, thereby enabling the plate projections 342 to be kept inserted into the socket 336. In addition, the outer surface of the circular spring 344 circumscribes the cone-shaped opening 338 and is in close contact therewith, and the opposite portions of the plate projections 342 protrude from the bottom surface 88 of the first casing 80 by a predetermined distance. Accordingly, when the cavity filter 18 of the present embodiment is mounted, the pin member 330 is electrically connected to the electrode pad while the circular spring 344 is elastically deformed into an elliptical shape as the electrode pad presses the circular spring 344, thereby serving to provide a contact pressure enough to press the contact portion so that there is no change in the contact state even when external vibration is applied thereto.

The cavity filter 18 according to the embodiments of the present disclosure provides the RF connection terminal unit 20 including the elastic connector 240, or 340 formed to expose the terminal to both surfaces or one surface in the height direction, so that the thickness of the cavity filter 18) is reduced. Therefore, it is possible to build a Massive MIMO antenna system having a slimmer and compact stacked structure.

While one or more exemplary embodiments have been described with reference to the accompanying drawings, it is to be understood by those skilled in the art that various modifications and changes in form and details can be made therein without departing from the spirit and scope as defined by the appended claims. Therefore, the description of the exemplary embodiments should be construed in a descriptive sense only and not to limit the scope of the claims, and many alternatives, modifications, and variations will be apparent to those skilled in the art.

INDUSTRIAL APPLICABILITY

A cavity filter according to exemplary embodiments of the present disclosure can be used for base station antennas for mobile communication.

The invention claimed is:

1. A cavity filter comprising:
a resonant element comprising a coupling block;
a first casing comprising the resonant element therein;
a second casing disposed to cover one surface of the first casing;
a terminal unit passing through the first casing such that one end thereof protrudes to be connected to an electrode pad of an external member provided outside the first casing and the other end thereof is electrically connected to the coupling block of the resonant element provided in proximity to the second casing, the terminal unit being electrically insulated from the first casing; and
an assembly unit provided on either one side or both sides of the first casing in a longitudinal direction thereof and formed with a terminal insertion hole into which the terminal unit is inserted and installed,
wherein the assembly unit protrudes outward from a lower surface of the first casing.

2. The cavity filter according to claim 1, wherein:
the terminal insertion hole is formed in such a manner that at least a portion of the first casing is recessed from the lower surface of the first casing or extends from the first casing toward a PCB; and
the terminal unit comprises:
a pin member disposed in the terminal insertion hole and configured such that one end thereof is connected to the coupling block of the resonant element and the other end thereof is connected to the PCB; and
a terminal body through which the pin member passes, and which is installed together with the pin member in the terminal insertion hole, the terminal body having an elastic member accommodated therein to apply an elastic force to the pin member.

3. The cavity filter according to claim 2, wherein the terminal body is provided therein with a pin connector elastically supported toward the PCB by the elastic member.

4. The cavity filter according to claim 3, wherein the pin connector has a tip further protruding outward from the terminal insertion hole by the elastic member.

5. The cavity filter according to claim 2, wherein:
the terminal insertion hole comprises a first insertion hole having a relatively larger inner diameter on its side where the PCB is provided, and a second insertion hole having a relatively smaller inner diameter than the first insertion hole; and
the cavity filter further comprises a dielectric bush inserted into the second insertion hole.

6. The cavity filter according to claim 5, further comprising a terminal head block coupled to the terminal body and seated in the first insertion hole.

7. The cavity filter according to claim 5, further comprising a ground terminal electrically connected to the first casing,
wherein the first casing is formed with an annular groove surrounding the first insertion hole to have an installation surface on which the ground terminal is installed.

8. The cavity filter according to claim 7, wherein:
the annular groove is in the form of an annular dovetail in which a circumferential surface diameter corresponding to its inner diameter increases in a depth direction; and
the annular groove has a minimum inlet inner diameter that allows the ground terminal to shrink by elasticity and be inserted into the annular groove, thereby preventing separation of the ground terminal.

9. The cavity filter according to claim 8, wherein the ground terminal comprises:
a fixing ring seated on and fixed to the installation surface of the annular groove; and
a plurality of elastic grounds circumferentially formed on an inner peripheral end of the fixing ring and extending toward the center thereof while obliquely extending toward the PCB.

10. The cavity filter according to claim 2, wherein:
the terminal insertion hole comprises a first insertion hole having the relatively largest diameter on its side where the PCB is provided, a second insertion hole having a relatively smaller inner diameter than the first insertion hole, and a third insertion hole having a relatively smaller inner diameter than the second insertion hole; and
the cavity filter further comprises a dielectric bush inserted into the second and third insertion holes, the dielectric bush being in the form of a two-stage cylinder.

11. The cavity filter according to claim 10, wherein:
the terminal unit further comprises a pin member disposed in the terminal insertion hole and configured such that one end thereof is connected to the resonant element and the other end thereof is connected to the PCB; and
the pin member comprises:
a pin corresponding to the one end of the terminal unit and positioned over the second and third insertion holes such that the pin is connected to the resonant element;
a terminal body being in the form of a two-stage cylinder integral with the pin, the terminal body being formed therein with a socket having a cone-shaped opening, the terminal body being positioned over the first insertion hole; and
an elastic connector corresponding to the other end of the terminal unit and inserted and fixed into the socket, the elastic connector being connected to the PCB.

12. The cavity filter according to claim 11, wherein the elastic connector is a cylindrical structure that is inserted into the socket, and comprises a truncated conical pin-socket contact portion inserted corresponding to the cone-shaped opening and an impedance matching portion extending from the pin-socket contact portion.

13. The cavity filter according to claim 12, wherein the elastic connector is inserted into the socket while being in contact with the PCB, and comprises a circular spring formed to have a circular vertical cross-section in its constant width except for both ends and two plate projections protruding perpendicular to a circumference of the circular spring from two points adjacent thereto.

* * * * *